US008130857B2

(12) United States Patent
Kim et al.

(10) Patent No.: US 8,130,857 B2
(45) Date of Patent: Mar. 6, 2012

(54) METHOD AND APPARATUS FOR PILOT MULTIPLEXING IN A WIRELESS COMMUNICATION SYSTEM

(75) Inventors: Byoung-Hoon Kim, San Diego, CA (US); Yongbin Wei, San Diego, CA (US); Amir Dabbagh, Palatine, IL (US)

(73) Assignee: QUALCOMM Incorporated, San Diego, CA (US)

( * ) Notice: Subject to any disclaimer, the term of this patent is extended or adjusted under 35 U.S.C. 154(b) by 1031 days.

(21) Appl. No.: 11/624,646

(22) Filed: Jan. 18, 2007

(65) Prior Publication Data

US 2007/0195906 A1    Aug. 23, 2007

Related U.S. Application Data

(60) Provisional application No. 60/760,482, filed on Jan. 20, 2006.

(51) Int. Cl.
*H04B 7/08* (2006.01)
(52) U.S. Cl. ....................................... 375/267
(58) Field of Classification Search .................. 375/133, 375/138, 141, 260, 262, 265, 267; 370/208, 370/210; 455/500, 509, 69
See application file for complete search history.

(56) References Cited

U.S. PATENT DOCUMENTS

| 2004/0047284 | A1  | 3/2004 | Eidson |
| 2004/0081073 | A1* | 4/2004 | Walton et al. ................. 370/204 |
| 2004/0165676 | A1* | 8/2004 | Krishnan et al. ............. 375/267 |
| 2004/0179627 | A1  | 9/2004 | Ketchum et al. |
| 2006/0034163 | A1* | 2/2006 | Gore et al. .................... 370/208 |
| 2006/0203932 | A1* | 9/2006 | Palanki et al. ................ 375/295 |
| 2007/0014272 | A1* | 1/2007 | Palanki et al. ................ 370/344 |

FOREIGN PATENT DOCUMENTS

| EP | 1206061 A1 | 5/2002 |
| EP | 1494381 A1 | 1/2005 |
| EP | 1566936 A1 | 8/2005 |
| EP | 1610514 A1 | 12/2005 |
| EP | 1635481    | 3/2006 |

(Continued)

OTHER PUBLICATIONS

Chu, David C., "Polyphase Codes with Good Periodic Correlation Properties", IEEE Transactions on Information Theory, Jul. 1972, 531-532, IEEE.

(Continued)

*Primary Examiner* — Young T. Tse
(74) *Attorney, Agent, or Firm* — Rupit Patel; Kenyon S. Jenckes

(57) ABSTRACT

Techniques for multiplexing pilots in a wireless transmission are described. In one aspect, a transmitter station generates multiple pilot sequences for multiple transmit antennas, with each pilot sequence comprising pilot symbols sent in the time domain on a different set of subcarriers. The transmitter station further generates multiple pilot transmissions for the transmit antennas based on the pilot sequences. In another aspect, a transmitter station generates multiple pilot sequences for multiple transmit antennas based on frequency-domain code division multiplexing (FD-CDM) of a Chu sequence defined by a transmitter-specific value. The transmitter station further generates multiple pilot transmissions for the transmit antennas based on the pilot sequences. In yet another aspect, a transmitter station generates multiple pilot transmissions for multiple transmit antennas based on a first multiplexing scheme and generates multiple data transmissions based on a second multiplexing scheme that is different from the first multiplexing scheme.

7 Claims, 7 Drawing Sheets

FOREIGN PATENT DOCUMENTS

| JP | 2004253899 A | 9/2004 |
|---|---|---|
| JP | 2004341442 A | 12/2004 |
| JP | 2005295489 A | 10/2005 |
| RU | 2141168 C1 | 11/1999 |
| WO | WO2004038988 | 5/2004 |
| WO | 2004077730 | 9/2004 |

OTHER PUBLICATIONS

Stüber, Gordon L. et al., "Broadband MIMO-OFDM Wireless Communications", Proceedings of the IEEE, Feb. 2004, 271-294, vol. 92, No. 2, IEEE.

Minn H et al., "Optimal training signals for MIMO OFDM channel estimation," Global Telecommunications Conference. 2004, Globecom IEEE Dallas. TX, vol. 1, Nov. 29, 2004. pp. 219-224.

Siew J et al., "A bandwidth efficient channel estimation algorithm for MIMO-SCFDE." Vehicular Technology Conference, 2003, IEEE 58th Orlando, FL. vol. 2. Oct. 6, 2003, pp. 1142-1146.

International Search Report—PCT/US07/060776, International Search Authority—European Patent Office, Aug. 28, 2007.

Written Opinion—PCT/US07/060776. International Search Authority—European Patent Office, Aug. 28, 2007.

International Preliminary Report on Patentability—PCT/US07/060776, The International Bureau of WIPO—Geneva. Switzerland, Jul. 22, 2008.

Lu L., et al: "Extended Orthogonal Polyphase Codes for Multicarrier Coma System" IEEE Communications Letters, IEEE Service Center. Piscataway, NJ, US, vol. 8, No. 12, Dec. 1, 2004, pp. 700-702.

Minn H., et al- "Par-constrained training signal designs for MIMO OFDM channel estimation in the presence of frequency offsets" Vehicular Technology Conference. 2005. VTC-2005-Fall. 2005 IEEE 62nd Dallas, TX, USA Sep. 25, 2005, Piscataway, NJ, USA, IEEE, vol. 3, Sep. 25-28, 2005, pp. 1465-1470.

Siew, et al., "A Channel Estimation Algorithm for MIMO-SCFDE" IEEE Communication Letters, vol. 8, No. 9, Sep. 2004, pp. 555-557.

European Search Report—EP08168532—Search Authority—Munich—Mar. 23, 2009.

European Search Report—EP08168533—Search Authority—Munich—Mar. 18, 2009.

Kun-Wah Yip, "Tight Error Bounds for Asynchronous Multicarrier CDMA and Their Application", IEEE Communications letters, vol. 2, No. 11, Nov. 1998, XP11010634.

* cited by examiner

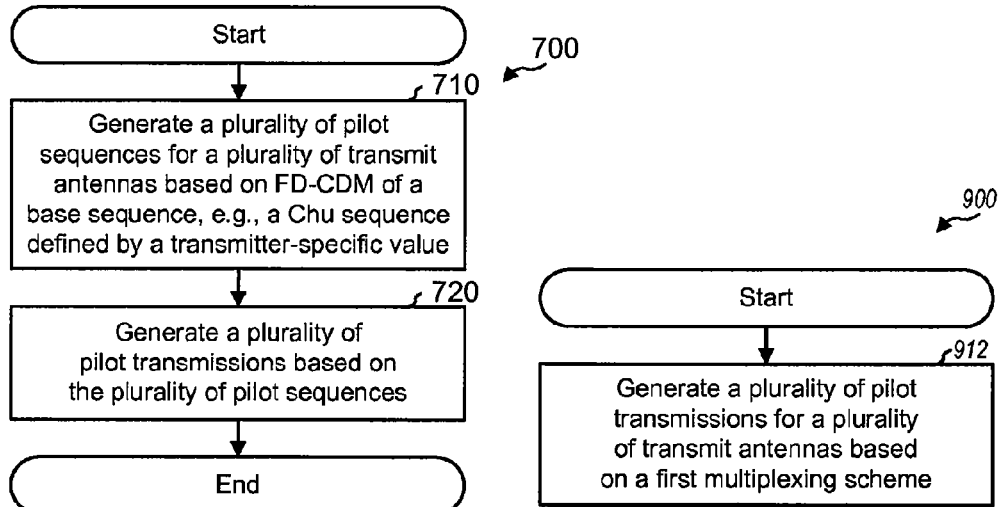
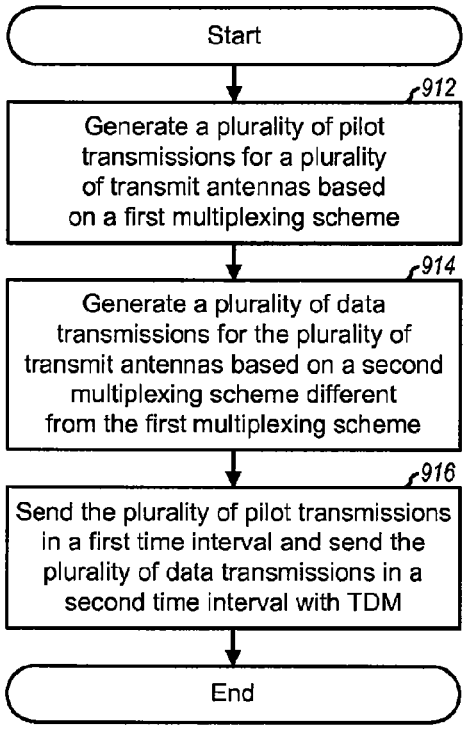
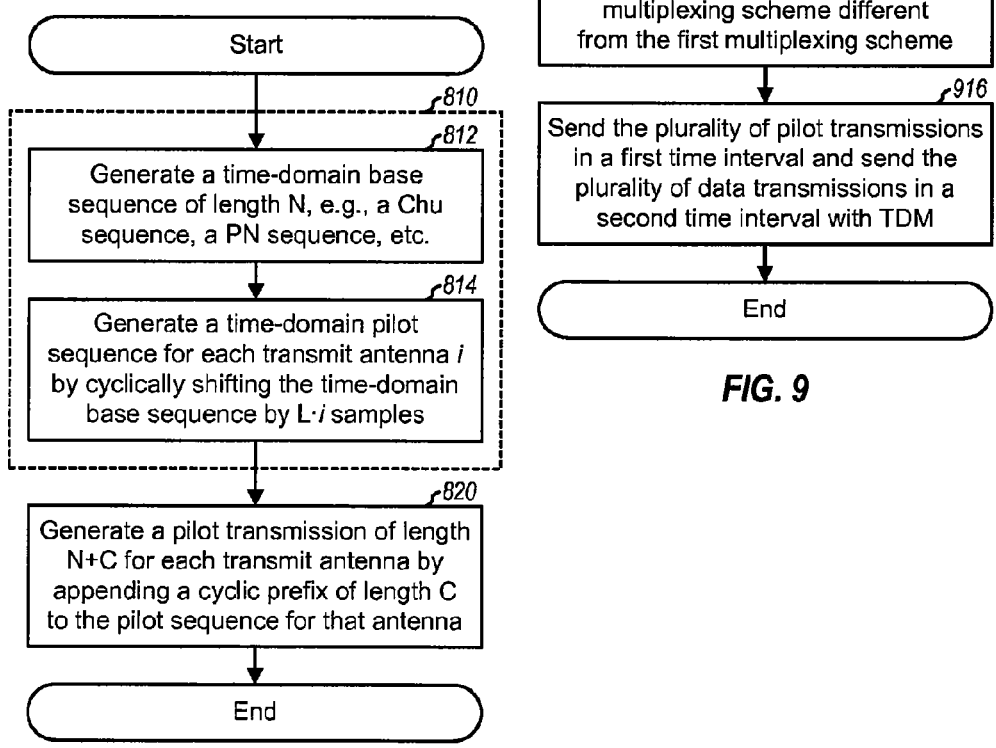

METHOD AND APPARATUS FOR PILOT MULTIPLEXING IN A WIRELESS COMMUNICATION SYSTEM

CLAIM OF PRIORITY UNDER 35 U.S.C. §119

The present Application for Patent claims priority to Provisional Application Ser. No. 60/760,482, entitled "METHOD AND APPARATUS FOR PILOT MULTIPLEXING IN A WIRELESS COMMUNICATIONS SYSTEM," filed Jan. 20, 2006, assigned to the assignee hereof, and expressly incorporated herein by reference.

BACKGROUND

1. Field

The present disclosure relates generally to communication, and more specifically to techniques for transmitting pilots in a wireless communication system.

2. Background

In a wireless communication system, a transmitter station (e.g., a base station or a terminal) may utilize multiple (T) transmit antennas for a multiple-input multiple-output (MIMO) transmission to a receiver station equipped with multiple (R) receive antennas. The multiple transmit and receive antennas form a MIMO channel that may be used to increase throughput and/or improve reliability. For example, the transmitter station may transmit up to T data streams simultaneously from the T transmit antennas to improve throughput. Alternatively, the transmitter station may transmit a single data stream from up to T transmit antennas to improve reception by the receiver station.

Good performance may be achieved if the MIMO channel response can be accurately estimated. For example, the receiver station may use the MIMO channel response to perform data detection for the MIMO transmission, to select a spatial mapping matrix to be applied by the transmitter station for the MIMO transmission, etc. Channel estimation is typically supported by transmitting pilot symbols that are known a priori by the receiver station. The receiver station may then estimate the MIMO channel response based on the received pilot symbols and the known pilot symbols.

Channel estimates obtained based on pilot are typically impaired by both noise and interference. The noise may come from various sources such as the wireless channel, receiver electronics, etc. The interference may include inter-antenna interference and inter-transmitter interference. Inter-antenna interference is interference due to transmissions from other transmit antennas. Inter-antenna pilot interference may be present if multiple pilot transmissions are sent simultaneously from all T transmit antennas and the pilot transmission from each antenna interferes with the pilot transmissions from the other antennas. Inter-transmitter interference is interference due to transmissions from other transmitter stations. Inter-transmitter interference may also be referred to as inter-sector interference, inter-cell interference, inter-terminal interference, etc. The inter-antenna interference and inter-transmitter interference may adversely impact channel estimation, which may then degrade data performance.

There is therefore a need in the art for techniques to transmit pilot in a wireless communication system.

SUMMARY

According to an aspect, an apparatus is described which generates a plurality of pilot sequences for a plurality of transmit antennas, with each pilot sequence comprising a plurality of pilot symbols sent in the time domain on a different set of subcarriers. The apparatus further generates a plurality of pilot transmissions for the plurality of transmit antennas based on the plurality of pilot sequences.

According to another aspect, an apparatus is described which generates a plurality of pilot sequences for a plurality of transmit antennas based on frequency-domain code division multiplexing (FD-CDM) of a constant amplitude zero auto-correlation (CAZAC) sequence such as a Chu sequence defined by a transmitter-specific value. The apparatus further generates a plurality of pilot transmissions for the plurality of transmit antennas based on the plurality of pilot sequences.

According to yet another aspect, an apparatus is described which receives a plurality of pilot transmissions via a plurality of receive antennas, with each pilot transmission comprising a plurality of pilot symbols sent in the time domain on a different set of subcarriers. The apparatus processes the plurality of received pilot transmissions to obtain channel estimates.

According to yet another aspect, an apparatus is described which receives a plurality of pilot transmissions via a plurality of receive antennas, with the pilot transmissions being generated based on FD-CDM of a CAZAC sequence such as a Chu sequence defined by a transmitter-specific value. The apparatus processes the plurality of received pilot transmissions to obtain channel estimates.

According to yet another aspect, an apparatus is described which generates a plurality of pilot transmissions for a plurality of transmit antennas based on a first multiplexing scheme. The apparatus further generates a plurality of data transmissions for the plurality of transmit antennas based on a second multiplexing scheme that is different from the first multiplexing scheme.

According to yet another aspect, an apparatus is described which receives a plurality of pilot transmissions generated based on a first multiplexing scheme. The apparatus further receives a plurality of data transmissions generated based on a second multiplexing scheme that is different from the first multiplexing scheme. The plurality of pilot transmissions and the plurality of data transmissions are for a MIMO transmission sent from multiple transmit antennas to multiple receive antennas. The multiple transmit antennas may be located at a single transmitter station or multiple transmitter stations.

Various aspects and features of the disclosure are described in further detail below.

BRIEF DESCRIPTION OF THE DRAWINGS

FIGS. 7 and 8 show two processes for generating the FD-CDM pilot.

FIG. 9 shows a process for sending pilot and data with different multiplexing schemes.

DETAILED DESCRIPTION

The techniques described herein may be used for various wireless communication systems such as multiple-access communication systems, broadcast systems, wireless local area networks (WLANs), etc. The terms "systems" and "networks" are often used interchangeably. The multiple-access systems may be code division multiple access (CDMA) systems, time division multiple access (TDMA) systems, frequency division multiple access (FDMA) systems, orthogonal FDMA (OFDMA) systems, single-carrier FDMA (SC-FDMA) systems, spatial division multiple access (SDMA) systems, etc. The techniques may also be used for systems that employ different multiple access schemes for the downlink and uplink, e.g., OFDMA for the downlink and SC-FDMA for the uplink. The downlink (or forward link) refers to the communication link from the base stations to the terminals, and the uplink (or reverse link) refers to the communication link from the terminals to the base stations.

An OFDMA system utilizes orthogonal frequency division multiplexing (OFDM). An SC-FDMA system utilizes single-carrier frequency division multiplexing (SC-FDM). OFDM and SC-FDM partition the system bandwidth into multiple (K) orthogonal subcarriers, which are also commonly referred to as tones, bins, etc. Each subcarrier may be modulated with data. In general, symbols are sent in the frequency domain with OFDM and in the time domain with SC-FDM. SC-FDM includes (a) IFDM which transmits information on subcarriers that are uniformly distributed across a given frequency allocation and (b) localized frequency division multiplexing (LFDM) which transmits information on adjacent subcarriers.

Figure 1:
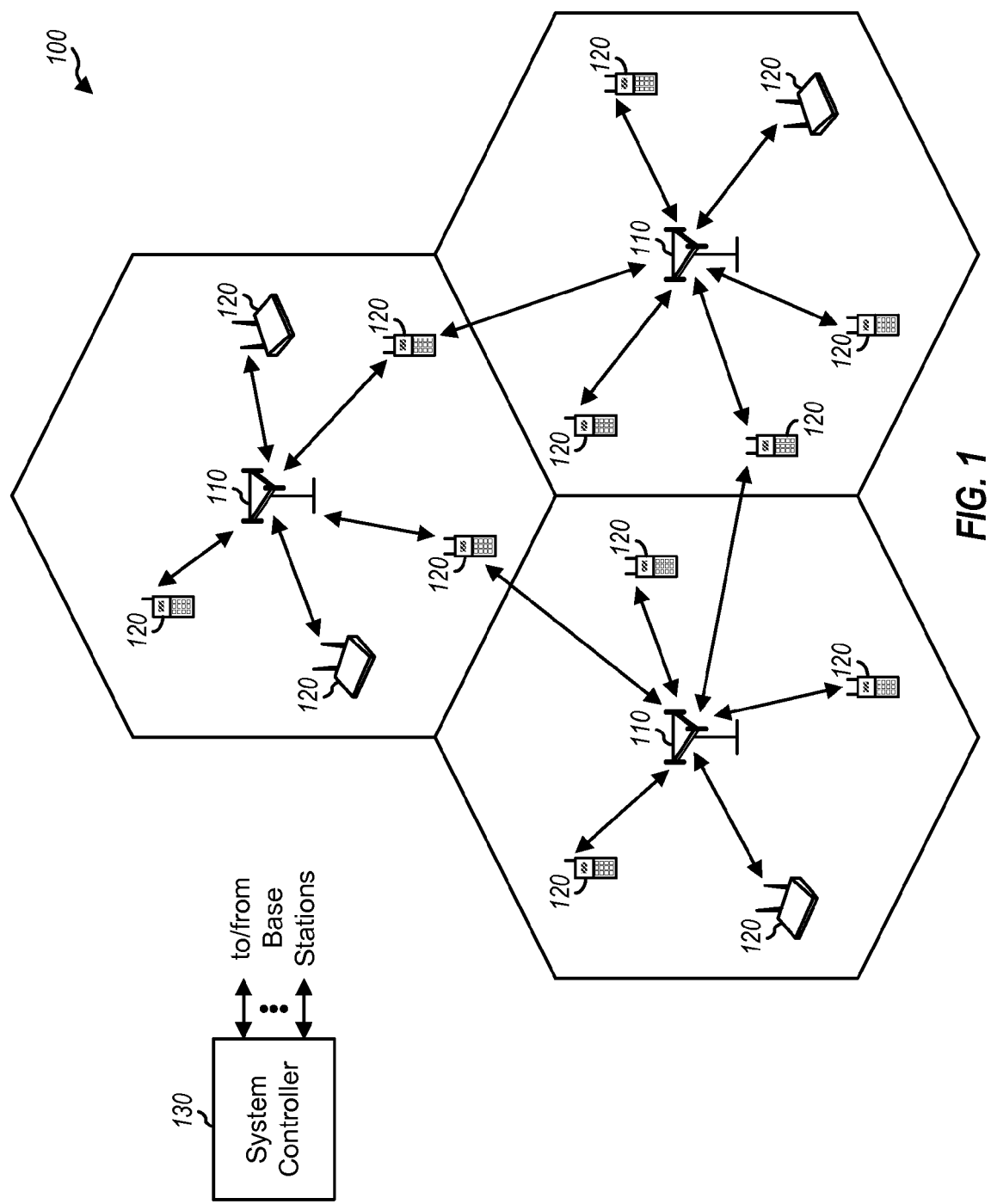
FIG. 1 shows a wireless multiple-access communication system.

FIG. 1 shows a wireless multiple-access communication system 100 with multiple base stations 110. A base station is generally a fixed station that communicates with the terminals and may also be referred to as a Node B, an enhanced Node B (eNode B), an access point, etc. Each base station 110 provides communication coverage for a particular geographic area. The term "cell" can refer to a base station and/or its coverage area depending on the context in which the term is used. To improve system capacity, a base station coverage area may be partitioned into multiple smaller areas, e.g., three smaller areas. Each smaller area may be served by a respective base transceiver station (BTS). The term "sector" can refer to a BTS and/or its coverage area depending on the context in which the term is used. For a sectorized cell, the BTSs for all sectors of that cell are typically co-located within the base station for the cell.

Terminals 120 may be dispersed throughout the system. A terminal may be stationary or mobile and may also be referred to as a user equipment, a mobile station, a mobile equipment, an access terminal, a station, etc. A terminal may be a cellular phone, a personal digital assistant (PDA), a wireless modem, a wireless communication device, a handheld device, a subscriber unit, a laptop computer, a cordless phone, etc.

A system controller 130 may couple to base stations 110 and provide coordination and control for these base stations. System controller 130 may be a single network entity or a collection of network entities.

Figure 2:
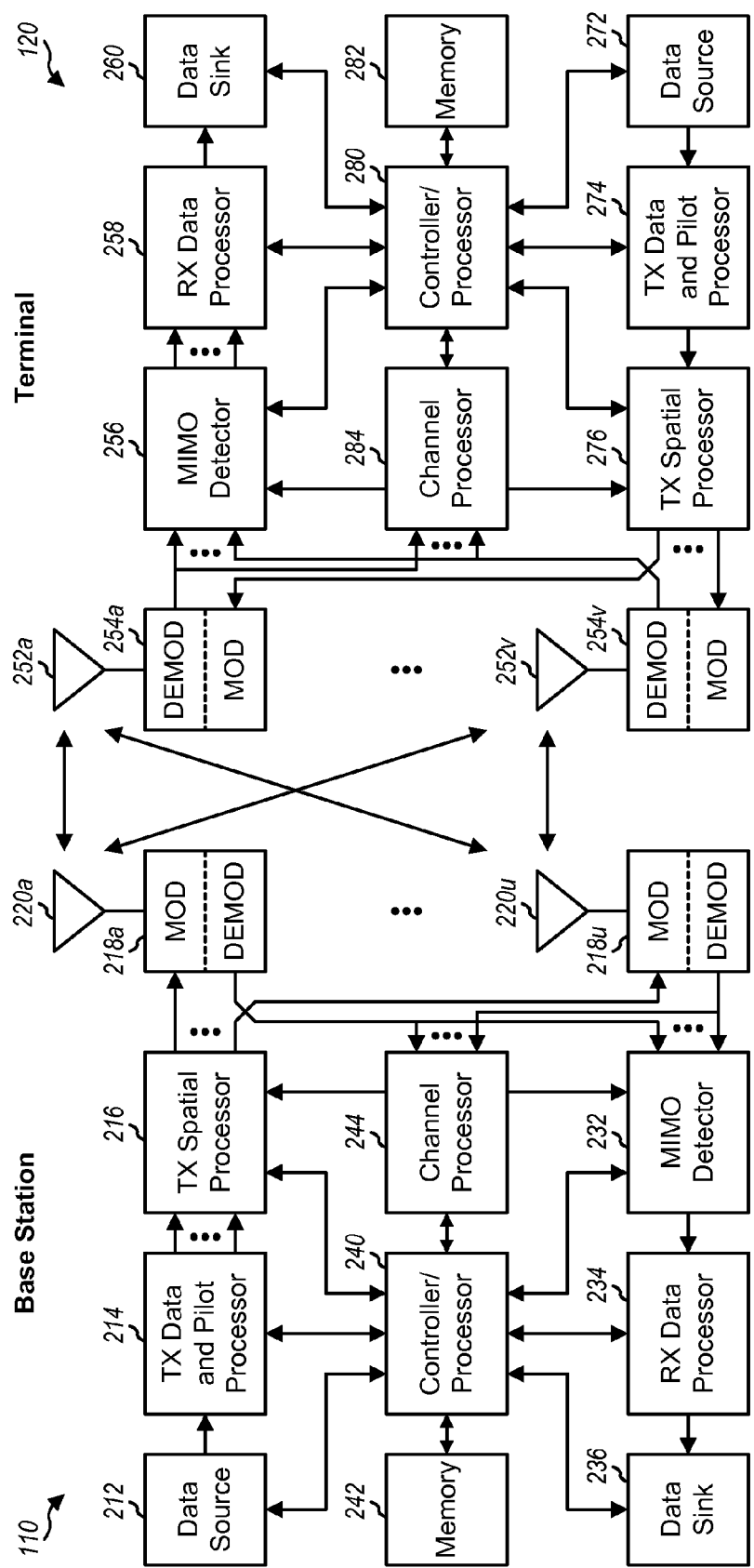
FIG. 2 shows a block diagram of a base station and a terminal.

FIG. 2 shows a block diagram of a design of a base station 110 and a terminal 120 in system 100. Base station 110 is equipped with multiple (U) antennas 220a through 220u, which may be used for data transmission on the downlink and data reception on the uplink. Terminal 120 is equipped with multiple (V) antennas 152a through 152v, which may be used for data transmission on the uplink and data reception on the downlink. Each antenna may be a physical antenna or an antenna array.

On the downlink, at base station 110, a transmit (TX) data and pilot processor 214 receives data from a data source 212, processes (e.g., formats, encodes, interleaves, and symbol maps) the data, and generates data symbols. Processor 214 also generates pilot symbols as described below and provides the pilot and data symbols to a TX spatial processor 216. As used herein, a data symbol is a symbol for data, a pilot symbol is a symbol for pilot, a zero symbol is a signal value of zero, and a symbol is typically a complex value. The data symbols may be modulation symbols from a modulation scheme such as PSK or QAM. Pilot is data that is known a priori by both the transmitter and receiver stations. Processor 216 multiplexes the pilot and data symbols, performs transmitter spatial mapping (if applicable), and provides U output symbol streams to U modulators (MOD) 218a through 218u. Each modulator 218 performs modulation (e.g., for OFDM, SC-FDM, etc.) on its output symbol stream to generate output chips and further processes (e.g., converts from digital to analog, analog filters, amplifies, and upconverts) the output chips to generate a downlink signal. U downlink signals from modulators 218a through 218u are transmitted via U antennas 220a through 220u, respectively.

At terminal 120, V antennas 252a through 252v receive the U downlink signals, and each antenna 252 provides a received signal to a respective demodulator (DEMOD) 254. Each demodulator 254 processes (e.g., filters, amplifies, downconverts, and digitizes) its received signal to obtain samples and further performs demodulation (e.g., for OFDM, SC-FDM, etc.) on the samples to obtain received symbols. Each demodulator 254 provides received data symbols to a MIMO detector 256 and provides received pilot symbols to a channel processor 284. Channel processor 284 estimates the downlink MIMO channel response based on the received pilot symbols and provides channel estimates to MIMO detector 256. MIMO detector 256 performs MIMO detection on the received data symbols with the channel estimates and provides data symbol estimates. An RX data processor 258 further processes (e.g., deinterleaves and decodes) the data symbol estimates and provides decoded data to a data sink 260.

On the uplink, at terminal 120, data from a data source 272 and pilot are processed by a TX data and pilot processor 274, further processed by a TX spatial processor 276, and modulated and processed by modulators 254a through 254v to generate V uplink signals, which are transmitted via V antennas 252a through 252v. At base station 110, the uplink signals are received by U antennas 220a through 220u, processed and demodulated by demodulators 218a through 218u, detected by a MIMO detector 232, and further processed by an RX data processor 234 to recover the data sent by terminal 120. A channel processor 244 estimates the uplink MIMO channel response based on the received pilot symbols and provides channel estimates to MIMO detector 232 for MIMO detection.

Controllers/processors 240 and 280 control the operation at base station 110 and terminal 120, respectively. Memories 242 and 282 store data and program codes for base station 110 and terminal 120, respectively.

The techniques described herein may be used with various subcarrier structures. The following description assumes that K total subcarriers are available for transmission and are assigned indices of 0 through K−1.

Figure 3A:
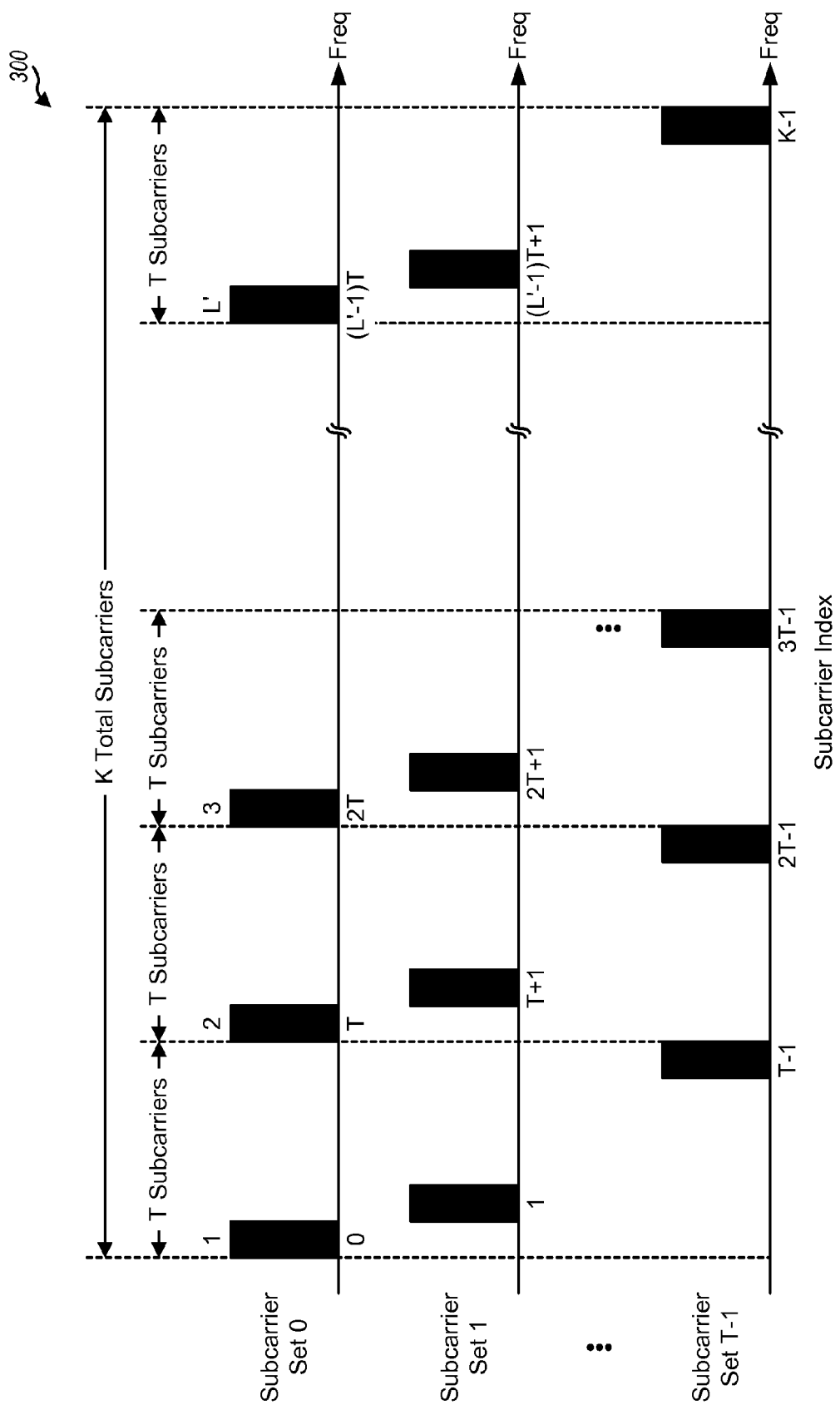
FIGS. 3A and 3B show two interleaved frequency division multiplexing (IFDM) pilot subcarrier structures.

FIG. 3A shows an IFDM pilot subcarrier structure 300 that may be used for IFDM or distributed OFDM data transmission. In subcarrier structure 300, the K total subcarriers are arranged into T disjoint or non-overlapping sets such that each set contains L' subcarriers that are uniformly distributed across the K total subcarriers, where T and L' are suitably selected integer values. Consecutive subcarriers in each set are spaced apart by T subcarriers, where K=T·L'. Hence, set i contains subcarriers i, T+i, 2T+i, ..., (L'−1)·T+i, for i∈{0, ..., T−1}.

Figure 3B:
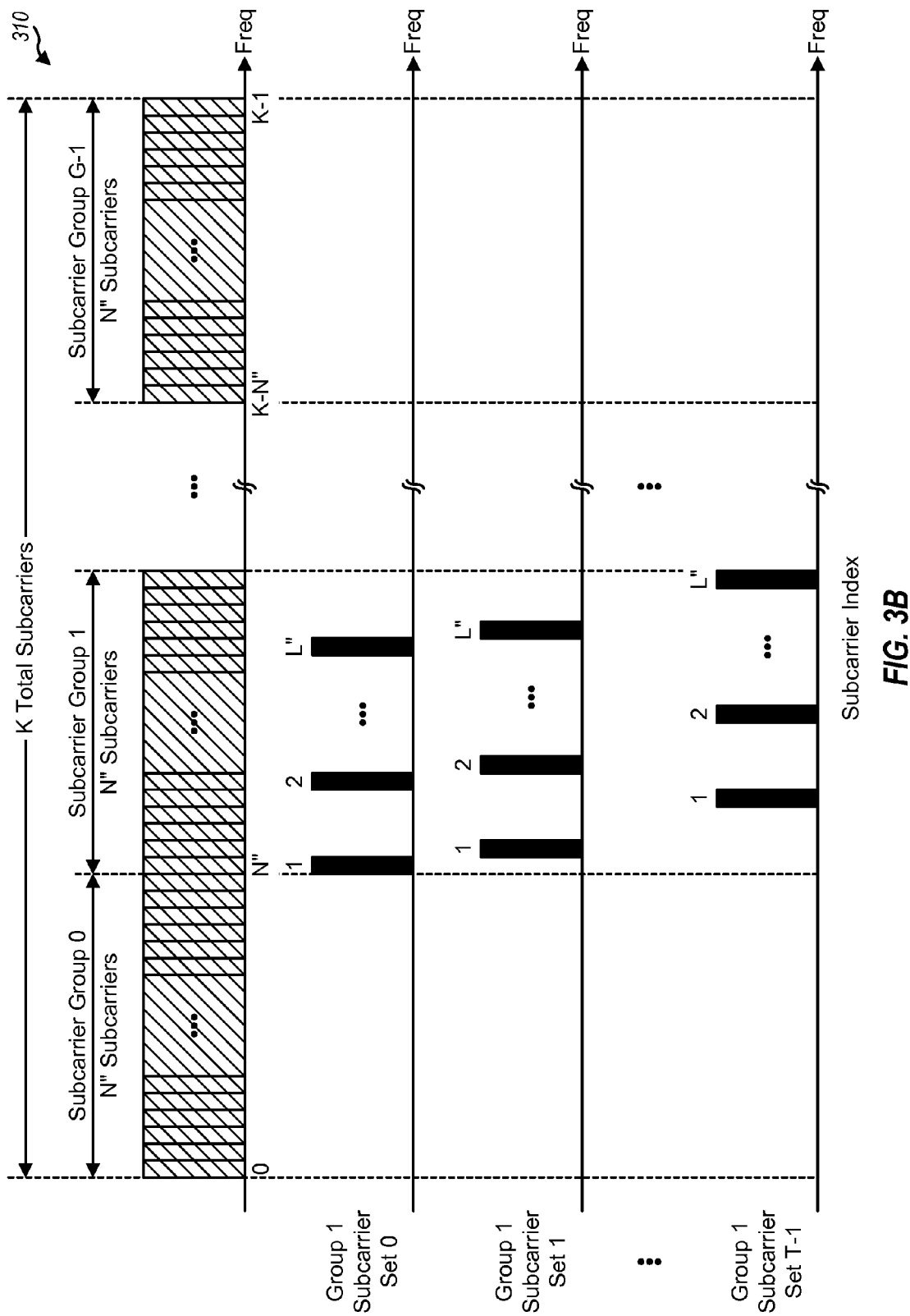

FIG. 3B shows an IFDM pilot subcarrier structure 310 that may be used for LFDM or localized OFDM data transmission. In subcarrier structure 310, the K total subcarriers are arranged into G disjoint groups such that each group contains N"=K/G consecutive subcarriers, where N" and G are suitably selected integer values. Thus, group 0 includes subcarrier 0 through N"−1, group 1 includes subcarriers N" through 2N−1, and so on, and group G−1 includes subcarriers K−N" through K−1.

The N" subcarriers in each group may be arranged into T disjoint sets such that each set contains L" subcarriers that are uniformly distributed across the N" subcarriers in that group, where N"=L"·T. The N" subcarriers in each group may thus be arranged in similar manner as described above in FIG. 3A. FIG. 3B shows the T sets of subcarriers for subcarrier group 1.

In general, any subcarrier structure may be used for pilot and data transmission on the downlink and uplink. For example, subcarrier structure 300 may be used for the downlink, and subcarrier structure 310 may be used for the uplink. Other subcarrier structures may also be used. On each link, pilot and data may be sent using the same or different subcarrier structures.

A transmitter station may transmit pilot via multiple (T) transmit antennas using various multiplexing schemes such as time division multiplexing (TDM), time-domain code division multiplexing (TD-CDM), OFDM, IFDM, FD-CDM, etc. A receiver station may receive the pilot via multiple (R) receive antennas and may estimate the MIMO channel response as well as background noise and interference based on the received pilot. For the downlink, the transmitter station may be base station 110, the receiver station may be terminal 120, T may be equal to U, and R may be equal to V. For the uplink, the transmitter station may be terminal 120, the receiver station may be base station 110, T may be equal to V, and R may be equal to U. Pilot for a MIMO transmission may comprise a different pilot sequence for each of the T transmit antennas. A pilot sequence is a sequence of known symbols that may be sent in the time domain or frequency domain depending on the multiplexing scheme used for the pilot.

For TDM pilot, a time interval designated for pilot may be partitioned into T time segments that may be assigned to the T transmit antennas. The transmitter station may send a pilot transmission from each antenna in the time segment assigned to that antenna. The pilot transmission from each antenna may be any pilot sequence and may be appended with a cyclic prefix to combat frequency selective fading caused by delay spread in a multipath channel. A cyclic prefix is also referred to as a guard interval, a preamble, etc. The cyclic prefix length may be selected based on the expected delay spread. A unique word may also be used in place of the cyclic prefix. The receiver station may estimate the MIMO channel response and noise using time-domain RAKE processing (which is commonly used in CDMA systems) or frequency-domain processing. Noise estimation may be trivial since pilot is sent from only one transmit antenna in any given time segment and there is no interference from other transmit antennas. Inter-transmitter pilot interference from other transmitter stations may be suppressed by using different pilot scrambling sequences for different transmitter stations.

For TD-CDM pilot, T different orthogonal sequences may be assigned to the T transmit antennas and used to achieve orthogonality in the time domain. The transmitter station may generate a time-domain pilot sequence for each transmit antenna by multiplying a time-domain base sequence with the orthogonal sequence for that antenna. The transmitter station may then generate a pilot transmission for each transmit antenna based on its time-domain pilot sequence. The pilot transmission from each transmit antenna may not observe multipath interference due to data streams but may observe multipath interference due to pilot transmissions from other transmit antennas. The receiver station may estimate the MIMO channel response using time-domain RAKE processing, which can exploit the orthogonality among the T pilot transmissions due to use of the orthogonal sequences assigned to the T transmit antennas. The receiver station may estimate noise without interference from the observed data streams. Inter-transmitter pilot interference may be suppressed by using different pilot scrambling sequences for different transmitter stations.

For OFDM and IFDM pilots, N subcarriers may be used for pilot transmission and may be arranged into T disjoint sets, e.g., as shown in FIG. 3A or 3B, with each set including L subcarriers, where N=T·L≦K. In FIG. 3A, N may be equal to K, and L may be equal to L'. In FIG. 3B, N may be equal to N", and L may be equal to L". In any case, the L subcarriers in each set may be uniformly distributed across the N subcarriers to allow the receiver station to sample the frequency spectrum across all of the N subcarriers, which may improve channel and noise estimation performance. Each of the T transmit antennas may be assigned a different one of the T subcarrier sets.

For OFDM pilot, the transmitter station may send a pilot transmission from each transmit antenna in the frequency domain on a set of L subcarriers assigned to that antenna. For each transmit antenna, the transmitter station may map L pilot symbols to L subcarriers in the assigned set, map zero symbols to the remaining K−L subcarriers, and generate an OFDM symbol based on the mapped pilot and zero symbols. The T pilot transmissions from the T transmit antennas occupy different subcarriers and are thus orthogonal in frequency. The receiver station may perform channel and noise estimation based on received pilot symbols using frequency-domain processing. The channel and noise estimation does not suffer from inter-antenna interference since orthogonality is achieved among the T pilot transmissions. However, a drawback with OFDM is high peak-to-average power ratio (PAPR), which means that the ratio of the peak power to the average power of an OFDM waveform can be high in the time domain. The pilot symbols used for each transmit antenna may be generated or selected such that the PAPR is as low as possible. Inter-transmitter interference may be mitigated by proper pilot planning, frequency hopping, etc.

For IFDM pilot, the transmitter station may send a pilot transmission from each transmit antenna in the time domain on a set of L subcarriers assigned to that antenna. For each transmit antenna, the transmitter station may transform L pilot symbols from the time domain to the frequency domain, map the L transformed symbols to L subcarriers in the assigned set, map zero symbols to the remaining K−L subcarriers, and generate an IFDM symbol based on the mapped transformed and zero symbols. The T pilot transmissions from the T transmit antennas occupy different subcarriers and are thus orthogonal in frequency. The receiver station may perform channel and noise estimation based on received pilot symbols using frequency-domain processing. The channel and noise estimation does not suffer from inter-antenna interference since orthogonality is achieved among the T pilot transmissions. Furthermore, high PAPR may be avoided by using pilot symbols with constant amplitude in the time domain. Good channel estimation performance may be achieved by properly generating the pilot symbols as described below. Inter-sector interference may be mitigated by proper pilot planning, frequency hopping, etc.

For FD-CDM pilot, T different orthogonal sequences may be assigned to the T transmit antennas and used to achieve orthogonality in the frequency domain. The transmitter station may generate a frequency-domain pilot sequence for each transmit antenna by multiplying a frequency-domain base sequence with the orthogonal sequence for that antenna. The transmitter station may then generate a pilot transmission for each transmit antenna based on its frequency-domain pilot sequence. The T pilot transmissions from the T transmit antennas may be nearly orthogonal in a multipath channel due to use of different orthogonal sequences. The receiver station may perform channel and noise estimation based on received pilot symbols using frequency-domain processing, e.g., in similar manner as for the OFDM and IFDM pilots.

Several multiplexing schemes for pilot are described in further detail below.

1. IFDM pilot

An IFDM pilot may be sent from the T transmit antennas on T disjoint sets of subcarriers, e.g., as shown in FIG. 3A or 3B, one set of L subcarriers for each transmit antenna. The IFDM pilot may be generated with a base sequence having good properties. For example, the base sequence may be selected to have good temporal characteristics (e.g., a constant time-domain envelope) and good spectral characteristics (e.g., a flat frequency spectrum). These good temporal and spectral characteristics may be obtained with various CAZAC (constant amplitude zero auto-correlation) sequences. Some example CAZAC sequences include a Chu sequence, a Frank sequence, a generalized chirp-like (GCL) sequence, a Golomb sequence, P1, P3, P4 and Px sequences, etc.

In one design, a Chu sequence $c_L(n)$ of length L is used as the base sequence for the IFDM pilot. This Chu sequence may be expressed as:

$$c_L(n) = e^{j\frac{\pi \lambda n^2}{L}}, \text{ for } n = 0, \ldots, L-1 \text{ with even } L, \quad \text{Eq (1)}$$

$$c_L(n) = e^{j\frac{\pi \lambda (n+1)n}{L}}, \text{ for } n = 0, \ldots, L-1 \text{ with odd } L, \quad \text{Eq (2)}$$

where $\lambda$ is a frequency increment index that is selected such that $\lambda$ and L are relatively prime and have a greatest common denominator of 1. L is the base sequence length and may correspond to the number of subcarriers assigned to each transmit antenna for pilot transmission. L may be a prime number (e.g., L=257), which may provide good cross-correlation properties for Chu sequences generated with L−1 different values of $\lambda$. L may also be selected based on the number of subcarriers used for pilot transmission by each transmit antenna (e.g., L=256).

In equations (1) and (2), $\lambda$ may be used as a transmitter-specific value or code to distinguish the pilots from different transmitter stations, as described below. A set of values may be determined for $\lambda$ based on the sequence length L. For example, the set may include $\lambda$ values of 1, 2, 3, 4, 5, and 6 for sequence length of L=7. Different $\lambda$ values may be assigned to different transmitter stations, e.g., different base stations on the downlink or different terminals on the uplink. Since two base sequences generated with different $\lambda$ values have minimal cross-correlation if the difference between the two $\lambda$ values are relatively prime to L, pilots sent by different transmitter stations with different $\lambda$ values minimally interfere with one another in such a case.

The Chu sequence has a constant time-domain envelope, which results in low PAPR for the pilot. The Chu sequence also has a flat frequency spectrum, which may improve channel estimation performance especially when the distribution of the channel spectral density is not known.

In another design, an L-point inverse discrete Fourier transform (IDFT) is performed on the Chu sequence $c_L(n)$ to obtain a transformed sequence $C_L(k)$ with L symbols. The transformed sequence is then used as the base sequence.

In yet another design, a pseudo-random number (PN) sequence pn(n) having good auto-correlation and cross-correlation properties and low PAPR properties in the time domain is used as the base sequence. The PN sequence may be derived in any manner known in the art, e.g., based on a polynomial generator or with an exhaustive search of all possible sequences of length L. Other sequences may also be used as the base sequence.

The IFDM pilot for the T transmit antennas may be generated in various manners. In one scheme, the base sequence is replicated T times and concatenated to obtain an extended base sequence, as follows:

$$b_{ext}(n) = \sum_{i=0}^{T-1} b_L(n - i \cdot L), \quad \text{Eq (3)}$$

where $b_L(n-i \cdot L)$ is a base sequence that is delayed by $i \cdot L$ samples, and $b_{ext}(n)$ is an extended base sequence of length N.

The base sequence $b_L(n)$ of length L may be equal to (a) the Chu sequence so that $b_L(n)=c_L(n)$, (b) the PN sequence so that $b_L(n)=pn(n)$, or (c) some other sequence. In equation (3), the T copies of the base sequence $b_L(n)$ are delayed and arranged such that the start of the i-th sequence follows immediately after the end of the (i−1)-th sequence. The T delayed sequences are summed to obtain the extended base sequence $b_{ext}(n)$ of length N.

A pilot sequence may be generated for each transmit antenna as follows:

$$p_i(n) = e^{j\frac{2\pi i n}{N}} \cdot b_{ext}(n), \text{ for } n = 0, \ldots, N-1, \quad \text{Eq (4)}$$

where $p_i(n)$ is the pilot sequence for transmit antenna i. Equation (4) applies a linear phase ramp to the N samples in the extended base sequence. The slope of the phase ramp is different for different transmit antennas.

The base sequence $b_L(n)$ contains L time-domain samples and occupies L consecutive subcarriers. The replication of the base sequence T times results in the extended base sequence $b_{ext}(n)$ occupying every T-th subcarriers in the frequency domain, with zeros for the T−1 subcarriers between consecutive occupied subcarriers. The multiplication with $e^{j2\pi i n/N}$ in equation (4) effectively shifts the pilot sequence for transmit antenna i by i subcarriers in the frequency domain. The T pilot sequences for the T antennas are shifted by different numbers of subcarriers and are thus orthogonal in the frequency domain, with each pilot sequence occupying a different set of L subcarriers, e.g., as shown in FIG. 3A or 3B.

Figure 4:
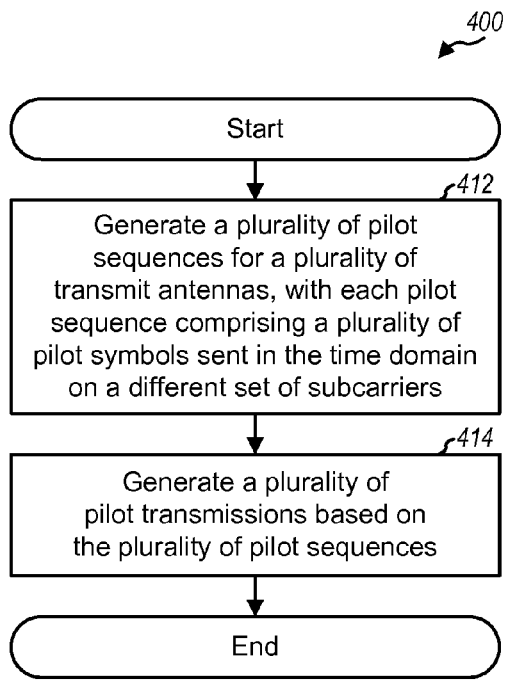
FIGS. 4 and 5 show two processes for generating an IFDM pilot.

FIG. 4 shows a process 400 for generating the IFDM pilot. A plurality of pilot sequences are generated for a plurality of transmit antennas, with each pilot sequence comprising a plurality of pilot symbols sent in the time domain on a different set of subcarriers (block 412). The plurality of pilot sequences may be generated based on a Chu sequence with λ=1, a Chu sequence defined by a transmitter-specific λ value, some other CAZAC sequence, a PN sequence, etc. A plurality of pilot transmissions are generated based on the plurality of pilot sequences (block 414).

Figure 5:
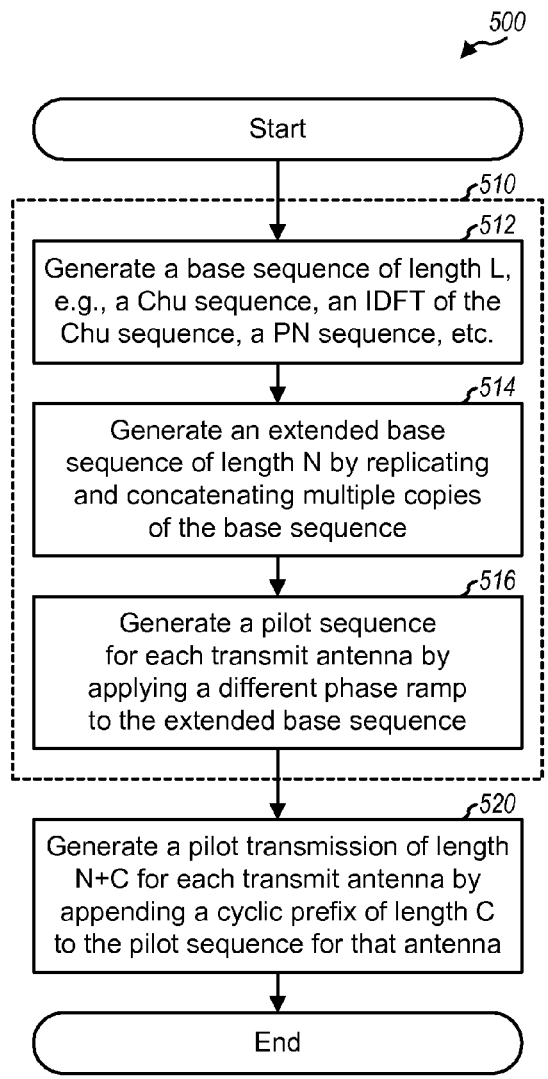

FIG. 5 shows a process 500 for generating the IFDM pilot. Process 500 includes blocks 510 and 520 that correspond to blocks 412 and 414, respectively, in FIG. 4. A base sequence of length L (e.g., a Chu sequence, an IDFT of the Chu sequence, a PN sequence, etc.) is initially generated (block 512). An extended base sequence of length N is then generated by replicating and concatenating multiple (T) copies of the base sequence (block 514). A pilot sequence is generated for each transmit antenna by applying a different phase ramp to the extended base sequence, e.g., as shown in equation (4) (block 516). A pilot transmission of length N +C may be generated for each transmit antenna by appending a cyclic prefix of length C to the pilot sequence for that antenna (block 520). The cyclic prefix insertion is achieved by copying the last C samples of the pilot sequence and appending these C samples to the start of the pilot sequence. The pilot transmission may also be generated in other manners based on the pilot sequence, e.g., the pilot sequence may be provided directly as the pilot transmission without any cyclic prefix.

In another scheme for generating the IFDM pilot for the T transmit antennas, which may be used for any subcarrier structure including the ones shown in FIGS. 3A and 3B, a time-domain base sequence with L pilot symbols (e.g., a Chu sequence) is initially generated. An L-point discrete Fourier transform (DFT) is then performed on the time-domain base sequence to obtain a frequency-domain base sequence with L transformed symbols. For each transmit antenna, the L transformed symbols are mapped to the L subcarriers assigned to that antenna, and N−L zero symbols are mapped to the remaining subcarriers. An N-point IDFT is then performed on the N transformed symbols and zero symbols to obtain a time-domain pilot sequence with N samples. A cyclic prefix may be appended to this pilot sequence to obtain the pilot transmission for the transmit antenna. The IFDM pilot for the T transmit antennas may also be generated in other manners.

In general, a pilot sequence or a pilot transmission may be generated by determining the symbols or samples for the pilot sequence/transmission based on appropriate equations, e.g., as described above. A pilot sequence or a pilot transmission may also be pre-computed and stored in memory. In this case, the pilot sequence or pilot transmission may be generated, whenever needed, by simply reading from the memory. Thus, the term "generate" may include any action (e.g., computation, memory retrieval, etc.) to obtain the pilot sequence or pilot transmission.

For the IFDM pilot, the T pilot transmissions from the T transmit antennas are disjoint in frequency and are thus orthogonal in a multipath channel. The PAPR is low if a pilot sequence with constant envelope in the time domain is used. Furthermore, the pilot energy is uniformly distributed in frequency if a CAZAC sequence such as a Chu sequence is used, which may simplify channel and noise estimation while providing good performance.

2. FD-CDM pilot

An FD-CDM pilot may be sent from the T transmit antennas on the same set of N subcarriers. However, the pilot transmission from each antenna is multiplied in the frequency domain with a different orthogonal sequence. The FD-CDM pilot may be generated with a base sequence having good characteristics.

In one design, a Chu sequence $c_N(n)$ of length N is used as a time-domain base sequence for the FD-CDM pilot. This Chu sequence, for even N, may be expressed as:

$$c_N(n) = e^{j\frac{\pi \lambda n^2}{N}}, \text{ for } n = 0, \ldots, N-1, \qquad \text{Eq (5)}$$

An N-point IDFT may be performed on the Chu sequence $c_N(n)$ to obtain a transformed Chu sequence $C_N(k)$ with N symbols. The transformed Chu sequence may be used as a frequency-domain base sequence $B_N(k)$. In another design, the Chu sequence $c_N(n)$ is used directly as the frequency-domain base sequence. In yet another design, a PN sequence PN(k) of length N is used as the frequency-domain base sequence. Other sequences may also be used as the base sequence. In general, the frequency-domain base sequence $B_N(k)$ of length N may be equal to (a) the Chu sequence so that $B_N(k)=c_N(n)$ where n=k, (b) the transformed Chu sequence so that $B_N(k)=C_N(k)$, (c) the PN sequence so that $B_N(k)=PN(k)$, or (d) some other sequence.

The FD-CDM pilot for the T transmit antennas may be generated in various manners. In one scheme, a frequency-domain pilot sequence may be generated for each transmit antenna as follows:

$$\tilde{P}_i(k) = W_i(k) \cdot B_N(k), \text{ for } k=0, \ldots, N-1, \qquad \text{Eq (6)}$$

where $W_i(k)$ is an orthogonal sequence for transmit antenna i, and $\tilde{P}_i(k)$ is a frequency-domain pilot sequence for transmit antenna i.

In general, various orthogonal sequences may be used for $W_i(k)$ in equation (6). For example, the orthogonal sequences may be Walsh sequences from a Hadamard matrix, sequences from a Fourier matrix, etc. The orthogonal sequences may also have any length that is equal to or longer than T and is an integer divisor of N. In one design, the orthogonal sequences are defined as follows:

$$W_i(k) = e^{j\frac{2\pi i k}{T}}, \text{ for } k = 0, \ldots, N-1 \text{ and } i = 0, \ldots, T-1. \qquad \text{Eq (7)}$$

T orthogonal sequences may be generated based on equation (7) for i=0, ... T−1. These orthogonal sequences have length of N but are periodic over T and thus repeat every T symbols. The use of these orthogonal sequences does not increase the time-domain PAPR nor the frequency-domain PAPR, which is desirable.

The frequency-domain pilot sequence for each transmit antenna may then be generated as follows:

$$\tilde{P}_i(k) = e^{j\frac{2\pi i k}{T}} \cdot B_N(k), \text{ for } k = 0, \ldots, N-1. \qquad \text{Eq (8)}$$

Equation (8) essentially modulates the frequency-domain base sequence with the orthogonal sequence, which is at a different frequency for each transmit antenna. It can be shown that modulating the frequency-domain base sequence by $e^{j2\pi i k/T}$ is equivalent to cyclically shifting the corresponding time-domain base sequence by L·i samples. The time-domain pilotsequence for each transmit antenna may then be generated as follows:

$$\tilde{p}_i(n) = b_N((n - i \cdot L) \bmod N), \text{ for } n = 0, \ldots, N-1, \qquad \text{Eq (9)}$$

where $b_N(n)$ is a time-domain base sequence of length N, and $\tilde{p}_i(n)$ is a time-domain pilot sequence for transmit antenna i.

The time-domain base sequence $b_N(n)$ may be equal to (a) the Chu sequence so that $b_N(b) = c_N(n)$, (b) the PN sequence so that $b_N(n) = pn(n)$, or (c) some other sequence. The cyclic shifting in equation (9) is achieved by taking the last L·i samples of the time-domain base sequence and appending these L·i samples to the start of the base sequence. Different numbers of samples are cyclically shifted for different transmit antennas. In particular, 0 samples are cyclically shifted for transmit antenna 0, L samples are cyclically shifted for transmit antenna 1, and so on, and (T−1)·L samples are cyclically shifted for transmit antenna T−1.

Figure 6:
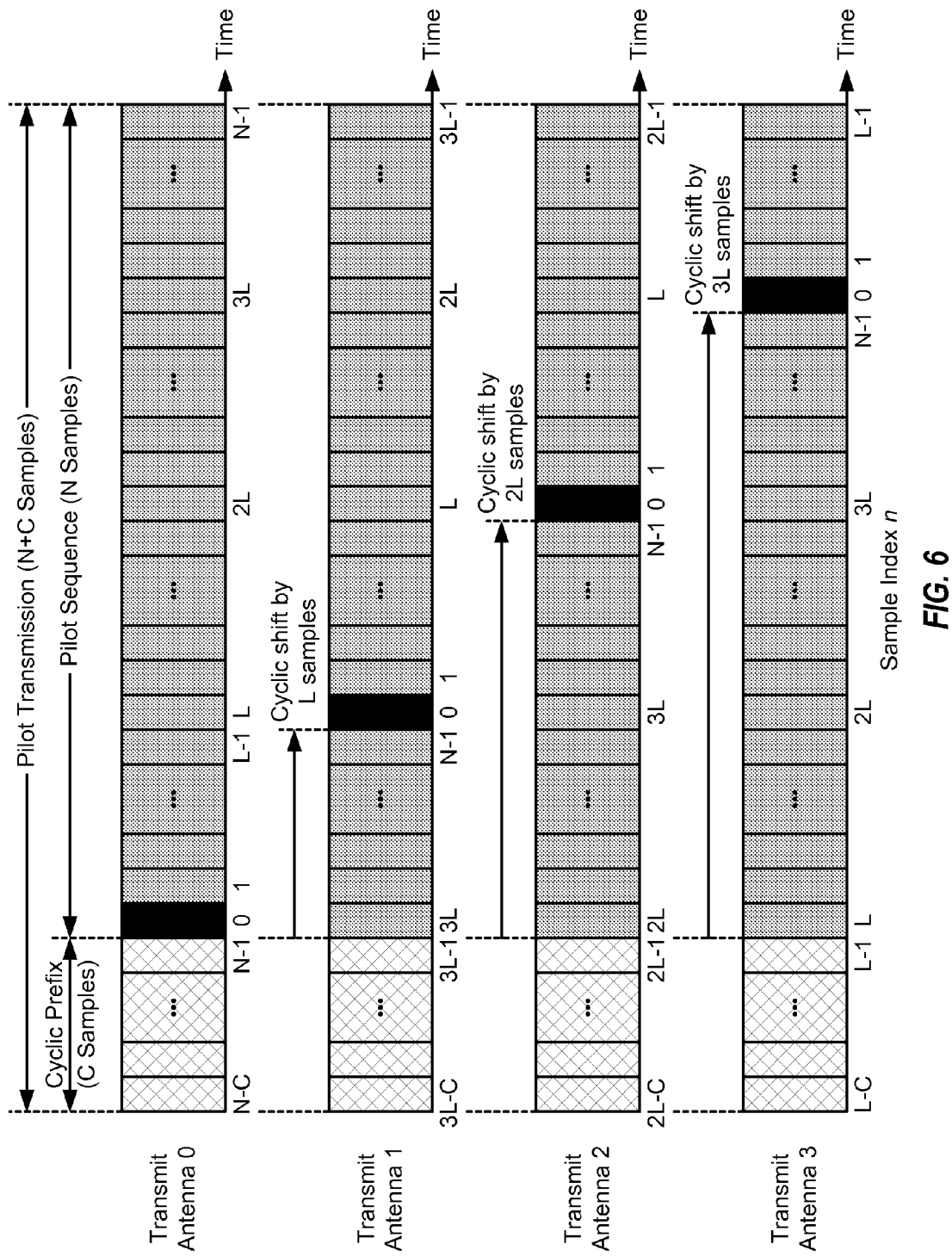
FIG. 6 shows pilot transmissions from 4 transmit antennas for an FD-CDM pilot.

FIG. 6 shows example pilot sequences and pilot transmissions for T=4 transmit antennas for the FD-CDM pilot. The pilot sequence for transmit antenna 0 is equal to the base sequence $b_N(n)$. The pilot sequence for transmit antenna 1 is equal to the base sequence cyclically shifted by L samples. The pilot sequence for transmit antenna 2 is equal to the base sequence cyclically shifted by 2L samples. The pilot sequence for transmit antenna 3 is equal to the base sequence cyclically shifted by 3L samples. The pilot transmission for each transmit antenna is generated by appending a cyclic prefix to the pilot sequence for that transmit antenna.

FIG. 7 shows a process 700 for generating the FD-CDM pilot. A plurality of pilot sequences are generated for a plurality of transmit antennas based on FD-CDM of a base sequence, e.g., a CAZAC sequence such as a Chu sequence defined by a transmitter-specific λ value (block 710). A plurality of pilot transmissions are generated based on the plurality of pilot sequences (block 720). The pilot transmissions may be sent on the downlink, and neighboring base stations may be assigned different transmitter-specific values. The pilot transmissions may also be sent on the uplink, and different terminals may be assigned different transmitter-specific values.

FIG. 8 shows a process 800 for generating the FD-CDM pilot. Process 800 includes blocks 810 and 820 that correspond to blocks 710 and 720, respectively, in FIG. 7. A time-domain base sequence of length N (e.g., a Chu sequence defined by a transmitter-specific value, a PN sequence, etc.) is initially generated (block 812). A time-domain pilot sequence for each transmit antenna i is then generated by cyclically shifting the time-domain base sequence by L·i samples (block 814). The cyclic shifting in the time domain achieves the frequency-domain multiplication with the orthogonal sequence shown in equation (7). A pilot transmission of length N+C may be generated for each transmit antenna by appending a cyclic prefix of length C to the time-domain pilot sequence for that antenna (block 820).

In another scheme for generating the FD-CDM pilot for the T transmit antennas, which may be used with any orthogonal sequences and for any subcarrier structure, a time-domain base sequence of length N (e.g., a Chu sequence defined by a transmitter-specific value) is initially generated and transformed with an N-point DFT to obtain a frequency-domain base sequence. For each transmit antenna, the frequency-domain base sequence is multiplied with an orthogonal sequence assigned to that antenna to obtain an intermediate sequence. An N-point IDFT is then performed on the intermediate sequence to obtain a time-domain pilot sequence of length N. A cyclic prefix may be appended to the time-domain pilot sequence to obtain the pilot transmission for the transmit antenna. The FD-CDM pilot for the T transmit antennas may also be generated in other manners.

For both the IFDM and FD-CDM pilots with the Chu sequences, different values of λ may be assigned to different transmitter stations to reduce pilot interference and assist the receiver stations acquire pilots from the different transmitter stations. On the downlink, different λ values may be assigned to neighboring base stations or BTSs, one λ value for each base station or BTS. Each base station or BTS may generate U pilot transmissions for its U antennas with the assigned λ value, e.g., as described above. A terminal may receive pilot transmissions from multiple base stations and may be able to detect and distinguish the pilot transmissions from each base station based on the λ value assigned to that base station or BTS. On the uplink, different λ values may be assigned to different terminals that may simultaneously sent pilot transmissions to the same base station or BTS, one λ value for each terminal. Each terminal may generate λ pilot transmissions for its λ antennas with the assigned λ value, e.g., as described above. The base station may receive pilot transmissions from multiple terminals and may be able to detect and distinguish the pilot transmissions from each terminal based on the λ value assigned to that terminal.

It is desirable for the pilot sequences from different transmitter stations (e.g., different base stations on the downlink or different terminals on the uplink) to have as low cross-correlation as possible. Pilot sequences of length L for the IFDM pilot or length N for the FD-CDM pilot may be generated with different λ values. The cross-correlation between these pilot sequences may be determined for different time shifts. A set of λ values with small cross-correlation between their pilot sequences may be selected for use.

Different λ values may also be used to support spatial division multiplexing (SDM) on the uplink. For example, multiple terminals transmitting simultaneously to a given base station may be assigned different λ values. Each terminal may generate its pilot transmissions based on its assigned λ value. Alternatively, the multiple terminals transmitting simultaneously to the base station may be assigned the same λ value but different orthogonal sequences or cyclic shifts. Each terminal may generate its pilot transmissions based on the common λ value and its assigned orthogonal sequences or cyclic shifts.

3. Pilot and Data Multiplexing Schemes

In general, the transmitter station may achieve orthogonality between pilot and data using TDM, FDM, etc. For TDM, the transmitter station may send pilot in some time intervals and send data in other time intervals. For FDM, the transmitter station may send pilot on some subcarriers and send data on other subcarriers. The transmitter station may achieve orthogonality between the pilot transmissions from the T transmit antennas using any of the multiplexing schemes described above. The transmitter station may send pilot from T transmit antennas using a first multiplexing scheme and may send data from the T antennas using a second multiplexing scheme. In general, the first multiplexing scheme may be the same as or different from the second multiplexing scheme.

FIG. 9 shows a process 900 for sending pilot and data with different multiplexing schemes. A plurality of pilot transmissions for a plurality of transmit antennas are generated based on a first multiplexing scheme (block 912). A plurality of data transmissions for the plurality of transmit antennas are generated based on a second multiplexing scheme that is different from the first multiplexing scheme (block 914). The plurality of pilot transmissions may be sent in a first time interval, and the plurality of data transmissions may be sent in a second time interval with TDM (block 916). The plurality of pilot transmissions may also be sent on a first set of subcarriers, and the plurality of data transmissions may be sent on a second set of subcarriers with FDM.

The first multiplexing scheme may be OFDM, and the second multiplexing scheme may be SC-FDM (e.g., IFDM or LFDM), TD-CDM, SDM, etc. The first multiplexing scheme may be SC-FDM (e.g., IFDM), and the second multiplexing scheme may be OFDM, TD-CDM, SDM, etc. The first multiplexing scheme may be FD-CDM, and the second multiplexing scheme may be OFDM, SC-FDM, TD-CDM, SDM, etc. The first and second multiplexing schemes may also be other combinations of multiplexing schemes.

The first multiplexing scheme may be selected to reduce pilot overhead while achieving good channel and noise estimation performance for MIMO transmission. The second multiplexing scheme may be selected to achieve good performance for data transmission among different streams of a single terminal or among different terminals. Different multiplexing schemes for pilot and data may be readily supported using frequency-domain processing for channel estimation and data detection, as described below.

4. Channel Estimation

The receiver station may receive pilot transmissions from the transmitter station and may perform channel estimation in various manners based on the received pilot transmissions. Channel estimation may be performed in different manners for different pilot multiplexing schemes. Several example channel estimation techniques are described below.

For the IFDM pilot, the receiver station may obtain R received pilot transmissions via the R receive antennas and may remove the cyclic prefix in each received pilot transmission to obtain N time-domain samples. The receiver station may then transform the N time-domain samples for each receive antenna with an N-point DFT to obtain N received symbols for the N subcarriers used for the IFDM pilot. The received symbols from each receive antenna may be expressed as:

$$R_j(k) = \sum_{i=0}^{T-1} P_i(k) \cdot H_{i,j}(k) + N_j(k), \quad \text{for } k = 0, \ldots, N-1. \quad \text{Eq (10)}$$

where $P_i(k)$ is a transmitted symbol from transmit antenna i on subcarrier k, $H_{i,j}(k)$ is a complex channel gain from transmit antenna i to receive antenna j on subcarrier k, $R_j(k)$ is a received symbol from receive antenna j on subcarrier k, and $N_j(k)$ is noise for receive antenna j on subcarrier k.

$P_i(k)$ is a frequency-domain pilot sequence that may be obtained by performing an N-point DFT on the time-domain pilot sequence $p_i(n)$ for transmit antenna i.

As shown in equation (10), the received symbol $R_j(k)$ from receive antenna j is composed of the sum of the T transmitted symbols $P_i(k)$ weighted by the channel gains $H_{i,j}(k)$ between the T transmit antennas and receive antenna j. The received symbol $R_j(k)$ is further degraded by noise $N_j(k)$. For the IFDM pilot, each transmit antenna i is assigned a different subset of the N subcarriers. Hence, the transmitted symbols $P_i(k)$ from transmit antenna i are non-zero for only L subcarriers assigned to antenna i.

In one design, the channel gains are estimated based on least-squares technique, as follows:

$$\hat{H}_{i,j}(k \cdot T + i) = \frac{R_j(k \cdot T + i)}{P_i(k \cdot T + i)}, \quad \text{for } k = 0, \ldots, L-1, \quad \text{Eq (11)}$$

where $\hat{H}_{i,j}(k \cdot T+i)$ is a channel gain estimate between transmit antenna i and receive antenna j for subcarrier k·T+i, which is an estimate of $H_{i,j}(k \cdot T+i)$. Since each transmit antenna is assigned a different set of L subcarriers, equation (11) derives the channel gain estimates for each transmit antenna i by dividing the received symbols from the L subcarriers assigned to antenna i by the transmitted symbols from antenna i.

In another design, the channel gains are estimated based on minimum mean-square error (MMSE) technique, as follows:

$$\hat{H}_{i,j}(k \cdot T + i) = \frac{R_j(k \cdot T + i) \cdot P_i^*(k \cdot T + i)}{|P_i(k \cdot T + i)|^2 + \sigma_N^2(k \cdot T + i)}, \quad \text{Eq (12)}$$

for $k = 0, \ldots, L-1$, where $\sigma_N^2(k \cdot T+i)$ is the variance of the noise $N_j(k \cdot T+i)$ for subcarrier k·T+i. For the Chu sequence, $|P_i(k \cdot T+i)|^2=1$ and the denominator in equation (12) may be replaced with $1+\sigma_N^2(k \cdot T+i)$.

A channel gain estimate may be derived based on equation (11) or (12) or some other equation for each subcarrier k of each pair of transmit antenna i and receive antenna j. T·R sets of channel gain estimates may be obtained for all T transmit antennas and R receive antennas, one set for each transmit-receive antenna pair, with each set including L channel gain estimates for L subcarriers. Each set of channel gain estimates may be transformed with an L-point IDFT to obtain a corresponding channel impulse response estimate with L taps, as follows:

$$\hat{h}_{i,j}(l) = IDFT\{\hat{H}_{i,j}(k)\}, \quad \text{Eq(13)}$$

where $\hat{h}_{i,j}(l)$ is a channel impulse response estimate between transmit antenna i and receive antenna j. The channel impulse response estimate may also be obtained from the channel gain estimates using least-squares, MMSE, robust MMSE, or some other technique known in the art.

Various types of post-processing such as truncation, thresholding, tap selection, etc., may be performed on the L channel taps of each channel impulse response estimate. For truncation, the first Q channel taps are retained and the remaining L−Q channel taps are zeroed out, where Q may be selected based on the expected delay spread of the wireless channel. For thresholding, channel taps with magnitude below a threshold are zeroed out, where the threshold may be a fixed value or a particular percentage of the total energy of all L channel taps. For tap selection, B best channel taps are retained and all other channel taps are zeroed out, where B may be a fixed value or a configurable value determined based on SNR, etc.

After completing the post-processing, the L-tap channel impulse response estimate for each transmit-receive antenna pair may be padded with N−L zeros. An N-point DFT may then be performed on the zero-padded channel impulse response estimate to obtain N channel gain estimates for the N subcarriers of the transmit-receive antenna pair. The channel gain estimates may be used for MIMO detection of received data symbols and/or other purposes For the FD-CDM pilot, the received symbols from each receive antenna may be expressed as:

$$\tilde{R}_j(k) = \sum_{i=0}^{T-1} \tilde{P}_i(k) \cdot H_{i,j}(k) + N_j(k), \quad \text{for } k = 0, \ldots, N-1, \quad \text{Eq (14)}$$

where $\tilde{R}_j(k)$ is a received symbol from receive antenna j on subcarrier k.

In one design, the channel gains are estimated based on the least-squares technique, as follows:

$$\hat{H}_{i,j}(k) = \frac{\tilde{R}_j(k)}{\tilde{P}_i(k)} = H_{i,j}(k) + H_{inf,j}(k) + \tilde{N}_j(k), \quad \text{Eq (15)}$$

$$\text{for } k = 0, \ldots, N-1,$$

$$\text{where } H_{inf,j}(k) = \frac{\sum_{m=0, m\neq i}^{T-1} \tilde{P}_m(k) \cdot H_{m,j}(k)}{\tilde{P}_i(k)}, \text{ and} \quad \text{Eq (16)}$$

$\tilde{N}_j(k) = N_j(k)/\tilde{P}_i(k)$ is processed noise.

$H_{inf,j}(k)$ is the interference observed by the channel gain estimates $\hat{H}_{i,j}(k)$ for transmit antenna i due to pilot transmissions from the other T−1 transmit antennas. For the orthogonal sequence shown in equation (7), the interference from each transmit antenna m to transmit antenna i may be expressed as:

$$\frac{\tilde{P}_m(k) \cdot H_{m,j}(k)}{\tilde{P}_i(k)} = e^{j\frac{2\pi(m-i)k}{T}} \cdot H_{m,j}(k), \quad \text{Eq (17)}$$

$$\text{for } m = 0, \ldots, T-1, m \neq i.$$

An N-point IDFT of equation (17) may be expressed as:

$$h_{m,j}(\ell - (m-i) \cdot L) = IDFT\left\{e^{j\frac{2\pi(m-i)k}{T}} \cdot H_{m,j}(k)\right\}. \quad \text{Eq (18)}$$

Equations (17) and (18) indicate that the interference from transmit antenna m to transmit antenna i is the channel impulse response $h_{m,j}(l)$ for transmit antenna m shifted by (m−i)·L taps. The amount of shift in $h_{m,j}(l)$ is equal to the difference in the cyclic shifts for transmit antennas m and i. L should thus be greater than the expected delay spread of the wireless channel. An N-point IDFT of equation (15) may then be expressed as:

$$\hat{h}_{i,j}(\ell) = h_{i,j}(\ell) + h_{inf,j}(\ell) + n(\ell), \quad \text{Eq (19)}$$

$$\text{where } h_{inf,j}(\ell) = \sum_{m=0, m\neq i}^{T-1} h_{m,j}(\ell - (m-i) \cdot L). \quad \text{Eq (20)}$$

Equations (19) and (20) indicate that the channel impulse response estimate $\hat{h}_{i,j}(l)$ between transmit antenna i and receive antenna j includes the desired channel impulse response $h_{i,j}(l)$ plus T−1 time shifted channel impulse responses for the other T−1 transmit antennas. The removal of the other pilot sequences in equation (6) may thus be performed in the time domain by retaining the first L channel taps, which contain $h_{i,j}(l)$ for transmit antenna i, and discarding the remaining N−L channel taps, which contain $h_{m,j}(l)$ for the other T−1 transmit antennas.

For the least-squares technique with a Chu sequence having a flat frequency spectrum, an N-point IDFT may be performed on the N received symbols $\tilde{R}_j(k)$ for N subcarriers, after removing the phase of the transformed Chu sequence, to obtain N channel taps. For other base sequences without a flat frequency spectrum (e.g., a PN sequence), the received symbols $\tilde{R}_j(k)$ may be divided by the frequency-domain base sequence $B_N(k)$ and then transformed with an N-point IDFT to obtain N channel taps. For the orthogonal sequence shown in equation (7), the first L channel taps may be provided as the channel impulse response estimate $\hat{h}_{0,j}(l)$ for transmit antenna 0, the next L channel taps may be provided as the channel impulse response estimate $\hat{h}_{1,j}(l)$ for transmit antenna 1, and so on, and the last L channel taps may be provided as the channel impulse response estimate $\hat{h}_{T-1,j}(l)$ for transmit antenna T−1.

In another design, the channel gains are estimated based on the MMSE technique, as follows:

$$\hat{H}_{i,j}(k) = \frac{R_j(k) \cdot \tilde{P}_i^*(k)}{|\tilde{P}_i(k)|^2 + \sigma_N^2(k)}, \quad \text{for } k = 0, \ldots, N-1. \quad \text{Eq (21)}$$

An N-point IDFT may be performed on the N channel gain estimates from equation (21) to obtain N channel taps for T channel impulse response estimates for the T transmit antennas, as described above.

In general, N received symbols $\tilde{R}_j(k)$ from N subcarriers for each receive antenna j may be processed with the frequency-domain base sequence $B_N(k)$ based on the least-squares technique, the MMSE technique, or some other technique to obtain N initial channel gain estimates $\hat{H}_{i,j}(k)$. The N initial channel gain estimates may be multiplied in the frequency domain with the orthogonal sequence $W_i(k)$ for each transmit antenna to obtain L channel gain estimates for that transmit antenna. The L channel gain estimates for each transmit antenna may be transformed with an L-point IDFT to obtain an L-tap channel impulse response estimate $\hat{h}_{i,j}(l)$ for that transmit antenna. Alternatively, the removal of the other pilot sequences may be performed in the time domain, as described above. In any case, post-processing (e.g., truncation, thresholding, tap selection, zero padding, etc.) may be performed on the L-tap channel impulse response estimate for each transmit antenna to obtain an N-tap zero-padded channel impulse response estimate, which may then be transformed with an N-point DFT to obtain N final channel gain estimates for the N subcarriers of that transmit antenna. The processing may be performed in different manners depending on the frequency-domain base sequence $B_N(k)$ and the orthogonal sequences $W_i(k)$ used for the FD-CDM pilot. Channel estimation may also be performed in other manners.

The background noise and interference for each subcarrier may be estimated based on the received symbols and the channel gain estimates. For the IFDM pilot, the noise and interference for each subcarrier k may be estimated as follows:

$$\sigma_{N,j}^2(k) = \left| R_j(k) - \sum_{i=0}^{T-1} P_i(k) \cdot \hat{H}_{i,j}(k) \right|^2. \qquad \text{Eq (22)}$$

where $\sigma_{N,j}^2(k)$ the estimated variance of the noise and interference for receive antenna j on subcarrier k. The noise and interference may be estimated in similar manner for the FD-CDM pilot, albeit with $R_j(k)$ replaced with $\tilde{R}_j(k)$ and $P_i(k)$ replaced with $\tilde{P}_i(k)$. The noise and interference estimate $\sigma_{N,j}(k)$ may be averaged across R receive antennas to obtain a noise and interference estimate $\sigma_N^2(k)$ for each subcarrier k, which may be used for MIMO detection and/or other purposes. The noise and interference estimate $\sigma_N^2(k)$ may also be averaged over all subcarriers and across time to obtain a long-term noise and interference estimate, which may be used to estimate operating conditions and/or for other purposes.

5. MIMO Detection

The receiver station may recover data symbols sent by the transmitter station based on various MIMO detection techniques such as an MMSE technique, a zero-forcing (ZF) technique, a maximal ratio combining (MRC) technique, a space-frequency equalization technique, etc. The received data symbols from the R receive antennas for each subcarrier k may be expressed as:

$$\underline{r}(k) = \underline{H}(k) \cdot \underline{x}(k) + \underline{n}(k) = \sum_{i=0}^{T-1} \underline{h}_i(k) \cdot X_i(k) + \underline{n}(k), \qquad \text{Eq (23)}$$

where
 $\underline{r}(k)$ is an R×1 vector of received symbols from the R receive antennas,
 $\underline{x}(k) = [X_0(k) \ldots X_{T-1}(k)]^T$ is a T×1 vector of transmitted symbols sent from the T transmit antennas, where "$T$" denotes a transpose,
 $\underline{h}_i(k) = [H_{i,0}(k) \ldots H_{i,R-1}(k)]^T$ is an R×1 vector of channel gains for transmit antenna i,
 $\underline{H}(k) = [\underline{h}_0(k) \ldots \underline{h}_{T-1}(k)]$ is an R×T MIMO channel response matrix, and
 $\underline{n}(k)$ is an R×1 vector of noise.

The transmitted symbols $X_i(k)$ may be data symbols sent in the frequency domain with OFDM or the DFT of data symbols sent in the time domain with SC-FDM. The channel gains in $\underline{h}_i(k)$ and $\underline{H}(k)$ may be estimated based on the received pilot transmissions, as described above.

Equalizer coefficients may be derived based on the MMSE, ZF, and MRC techniques, as follows:

$$\underline{w}_i^H(k) = \frac{S_i(k)}{1 + S_i(k) \cdot \underline{h}_i^H(k) \cdot \underline{\Psi}_i^{-1}(k) \cdot \underline{h}_i(k)} \cdot \underline{h}_i^H(k) \cdot \underline{\Psi}_i^{-1}(k), \qquad \text{Eq (24)}$$

$$\underline{\tilde{w}}_i^H(k) = \frac{S_i(k)}{1 + S_i(k) \cdot \underline{h}_i^H(k) \cdot \underline{h}_i(k)} \cdot \underline{h}_i^H(k), \text{ and} \qquad \text{Eq (25)}$$

$$\underline{\breve{w}}_i^H(k) = \underline{h}_i^H(k), \qquad \text{Eq (26)}$$

where
 $\underline{w}_i^H(k)$ is a 1×R vector of MMSE equalizer coefficients for transmit antenna i,
 $\underline{\tilde{w}}_i^H(k)$ is a 1×R vector of ZF equalizer coefficients for transmit antenna i,
 $\underline{\breve{w}}_i^H(k)$ is a 1×R vector of MRC equalizer coefficients for transmit antenna i, $S_i(k) = E\{|X_i(k)|^2\}$ is a power spectrum of $X_i(k)$ sent from antenna i,
 $\underline{\Psi}_i(k)$ is an R×R noise and interference covariance matrix for antenna i, and "$H$" denotes a conjugate transpose The noise and interference covariance matrix may be expressed as:

$$\underline{\Psi}_i(k) = \sum_{m=0, m \neq i}^{T-1} S_m(k) \cdot \underline{h}_m(k) \cdot \underline{h}_m^H(k) + \underline{R}(k), \qquad \text{Eq (27)}$$

where $\underline{R}(k) = E\{\underline{n}(k) \cdot \underline{n}^H(k)\}$ is an R×R noise covariance matrix, and $E\{\ \}$ is an expectation operation.

The noise covariance matrix may be approximated as $\underline{R}(k) = \sigma_N^2(k) \cdot \underline{I}$ for spatially and spectrally uncorrelated noise, where $\underline{I}$ is an identity matrix. $\underline{R}(k)$ may also be estimated based on equation (22).

MIMO detection for each transmit antenna i may be performed as follows:

$$Y_i(k) = \underline{w}_i^H(k) \cdot \underline{r}(k) = B_i(k) \cdot X_i(k) + V_i(k), \qquad \text{Eq(28)}$$

where
 $Y_i(k)$ is a biased estimate of $X_i(k)$ sent from transmit antenna i,
 $B_i(k) = \underline{w}_i^H(k) \cdot \underline{r}_i(k)$ is a scaling factor for $X_i(k)$, and
 $V_i(k)$ is post-detection noise and interference for $X_i(k)$.

The detected symbols for each transmit antenna i may then be expressed as:

$$\hat{X}_i(k) = \frac{Y_i(k)}{B_i(k)}. \qquad \text{Eq (29)}$$

The detected symbols $\hat{X}_i(k)$ may be provided directly as data symbol estimates if the data symbols are sent in the frequency domain with OFDM. The detected symbols may be transformed with an IDFT to obtain the data symbol estimates if the data symbols are sent in the time domain with SC-FDM.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Headings are included herein for reference and to aid in locating certain sections. These headings are not intended to limit the scope of the concepts described therein under, and these concepts may have applicability in other sections throughout the entire specification.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A non-transitory computer readable storage medium having stored thereon, a computer program being executable by at least one processor for data reception and causing the at least one processor to perform the steps of:
   receiving a plurality of pilot transmissions via a plurality of receive antennas, the plurality of pilot transmissions sent via a plurality of transmit antennas and each pilot transmission comprising a plurality of pilot symbols sent in time domain on a different set of subcarriers, one set of subcarriers for each of the plurality of transmit antennas; and
   processing the plurality of received pilot transmissions to obtain channel estimates;
   wherein the processing the plurality of received pilot transmissions comprises, for each received pilot transmission:
      deriving a plurality of channel impulse response estimates for the plurality of transmit antennas based on the received plurality of pilot transmissions;
      performing thresholding on each channel impulse response estimate to zero out channel taps with magnitude below a threshold; and
      deriving channel gain estimates for each transmit antenna based on a corresponding channel impulse response estimate after thresholding.

2. The computer readable storage medium of claim 1, wherein the at least one processor further performs the steps of obtaining received symbols based on the plurality of received pilot transmissions, obtaining a plurality of pilot sequences for the plurality of transmit antennas, and deriving the channel estimates based on the received symbols and the plurality of pilot sequences.

3. The computer readable storage medium of claim 2, wherein for each of the plurality of received pilot transmissions, the at least one processor further performs the steps of obtaining a plurality of sets of the received symbols for a plurality of sets of subcarriers based on the received pilot transmission, scaling each set of the received symbols based on a corresponding pilot sequence to obtain a set of scaled symbols, and deriving the channel estimates for each transmit antenna based on a corresponding set of scaled symbols.

4. A method comprising:
   receiving a plurality of pilot transmissions via a plurality of receive antennas, the plurality of pilot transmissions sent via a plurality of transmit antennas and each pilot transmission comprising a plurality of pilot symbols sent in time domain on a different set of subcarriers, one set of subcarriers for each of the plurality of transmit antennas; and
   processing the plurality of received pilot transmissions to obtain channel estimates;
   wherein the processing the plurality of received pilot transmissions comprises, for each received pilot transmission:
      deriving a plurality of channel impulse response estimates for the plurality of transmit antennas based on the received plurality of pilot transmissions;
      thresholding on each channel impulse response estimate to zero out channel taps with magnitude below a threshold; and
      deriving channel gain estimates for each transmit antenna based on a corresponding channel impulse response estimate after thresholding.

5. The method of claim 4, wherein the processing the plurality of received pilot transmissions further comprises:
   obtaining received symbols based on the plurality of received pilot transmissions,
   obtaining a plurality of pilot sequences for the plurality of transmit antennas, and
   deriving the channel estimates based on the received symbols and the plurality of pilot sequences.

6. An apparatus for data reception, comprising:
   at least one processor configured to:
      receive a plurality of pilot transmissions via a plurality of receive antennas, the plurality of pilot transmissions sent via a plurality of transmit antennas and each pilot transmission comprising a plurality of pilot symbols sent in time domain on a different set of subcarriers, one set of subcarriers for each of the plurality of transmit antennas; and
      process the plurality of received pilot transmissions to obtain channel estimates;
      wherein the at least one processor is configured to process the plurality of received pilot transmissions by, for each received pilot transmission:
         deriving a plurality of channel impulse response estimates for the plurality of transmit antennas based on the plurality of received pilot transmissions;
         performing thresholding on each channel impulse response estimate to zero out channel taps with magnitude below a threshold; and deriving channel gain estimates for each transmit antenna based on a corresponding channel impulse response estimate after thresholding; and a memory coupled to the at least one processor.

7. An apparatus for data reception, comprising:

means for receiving a plurality of pilot transmissions via a plurality of receive antennas, the plurality of pilot transmissions sent via a plurality of transmit antennas and each pilot transmission comprising a plurality of pilot symbols sent in time domain on a different set of subcarriers, one set of subcarriers for each of the plurality of transmit antennas; and means for processing the plurality of received pilot transmissions to obtain channel estimates;

wherein the means for processing the plurality of received pilot transmissions comprises, for each received pilot transmission:

means for deriving a plurality of channel impulse response estimates for the plurality of transmit antennas based on the pluralty of received pilot transmission;

means for performing thresholding on each channel impulse response estimate to zero out channel taps with magnitude below a threshold; and means for deriving channel gain estimates for each transmit antenna based on a corresponding channel impulse response estimate after thresholding.

* * * * *